(No Model.)

F. OVERN.
MACHINE FOR EMBEDDING WIRE NETTING IN GLASS.

No. 516,221. Patented Mar. 13, 1894.

Witnesses:
John E. Parker
J. Henderson

Inventor:
Frank Overn,
by his Attorney,

THE NATIONAL LITHOGRAPHING COMPANY,
WASHINGTON, D. C.

UNITED STATES PATENT OFFICE.

FRANK OVERN, OF PHILADELPHIA, PENNSYLVANIA, ASSIGNOR OF TWO-THIRDS TO JOHN OVERN, JR., AND HORACE PETTIT, OF SAME PLACE.

MACHINE FOR EMBEDDING WIRE-NETTING IN GLASS.

SPECIFICATION forming part of Letters Patent No. 516,221, dated March 13, 1894.

Application filed October 9, 1893. Serial No. 487,558. (No model.)

*To all whom it may concern:*

Be it known that I, FRANK OVERN, a citizen of the United States, and a resident of the city of Philadelphia and State of Pennsylvania, have invented a certain new and useful Improvement in Machines for Embedding Wire-Netting in Glass, of which the following is a full, clear, and exact description, reference being had to the accompanying drawings, forming a part of this specification.

My invention has for its object the construction of a machine for manufacturing sheets or plates of glass having embedded therein wire or wire netting and usually termed "wire glass," and for my process of making wire glass I have made application for Letters Patent, Serial No. 487,557. Sheets of glass of this character are especially valuable for use in skylights, vaults or in other places where strength is required.

Figure 1:
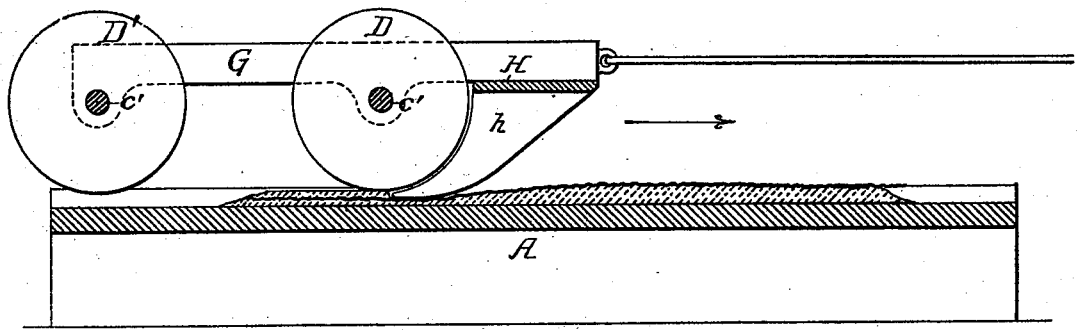
Figure 4:
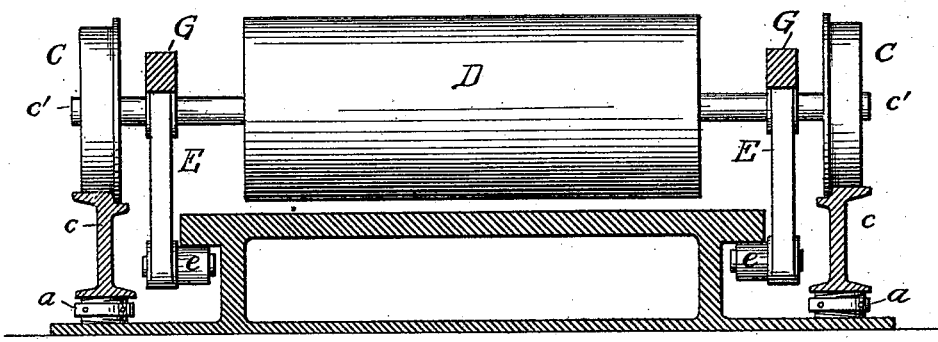
Figure 2:
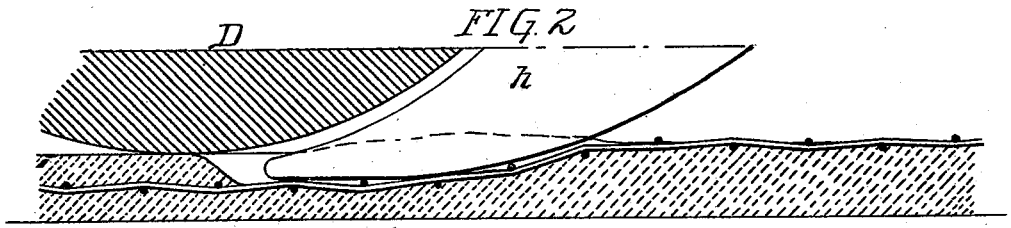
Figure 5:
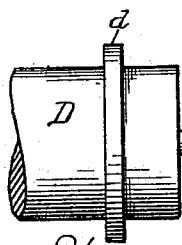
Figure 3:
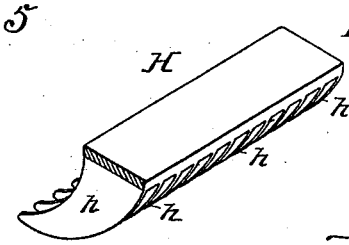

In the accompanying drawings:—Figure 1 is a sectional elevation of a machine constructed in accordance with my invention. Fig. 2 is an enlarged sectional view of a portion of the same. Fig. 3 is a perspective view of a detail. Fig. 4 is a transverse sectional elevation illustrating a modified construction of machine, and Fig. 5 is a broken sectional view illustrating a modified construction of pressing roller.

The process of manufacturing "wire glass" which this machine is designed to accomplish, and which forms the subject of separate application for patent filed of even date herewith, consists, in general, in pouring upon a table a sufficient quantity of glass to form a sheet of the required character; then, embedding in the glass before starting the rolling operation, the wire or wire netting and finally rolling the glass as usual to form a plate or sheet, the passage of the roller acting not only to smooth out the molten glass into the required form, but acting also to close the openings made by the passage of the wire, and it is proposed to first heat the wire or wire netting to the proper temperature, though this is not a necessary requirement, and then lay or otherwise apply the same upon the molten glass immediately after pouring, the wire tending by reason of its weight to sink partly within the glass and to a certain extent, acting to partially level off the glass into the form of a plate or sheet. A still further advantage resulting from the placing of heated netting upon the molten glass is that the netting retains its heat and when pressed into the glass will contract as the glass contracts in cooling, without danger of rupturing either the wire or glass.

Referring to the drawings Fig. 1, A represents a suitable table or plate upon which the molten glass is poured from the melting pot or furnace. At each side of the table are rails on which the pressing rolls, D, D', may be traveled. The construction of these parts may be similar to that ordinarily employed in machines for manufacturing plate glass, or the structure may be suitably modified to meet the peculiar requirements of the process which this machine is adapted to carry out. The ordinary construction of table of a plate glass rolling machine is usually provided on each edge with removable strips or ribs on which the pressing roller rests and travels, the height of the strip or rib determining the thickness of the subsequent sheet of glass, and such a structure may be employed in the present instance, although if necessary these strips may be omitted and the roller be provided at each end with a removable collar, $d$, as illustrated in Fig. 5, and a collar of suitable diameter be placed on each end of the roller before the machine is started into operation, the collar forming the bearings for the roller and their height or thickness regulating the thickness of the sheet of glass to be rolled.

In the construction shown in Fig. 4 the pressing roller is shown as provided with carrying wheels, C, which rest upon independent rails, $c$, running parallel to the table and at each side of the same. These rails rest upon adjusting screws, $a$, which may be readily turned in either direction so as to adjust the relative positions of the roller and table and alter the thickness of the sheet of glass to be manufactured.

In order to restrain any tendency of the roller to rise during the rolling operation, and thus allow the formation of ribs or corrugations in the glass, I may provide at each side of the table arms, E, depending from the frame in which the rollers are journaled and carrying at their lower ends anti-friction rollers, e, adapted to travel on the under side of the edges of the table, and the rollers, e, may be made adjustable on the arms, E, so as to permit vertical adjustment of the pressing rollers.

The frame, G, in which the glass pressing roller, or rollers, are journaled carries at its forward end a frame or plate, H, comprising a series of blades, h, the lower edges of which are in a plane about midway between the upper surface of the table, A, and the lower surface of the roller, and these blades are preferably so shaped as to allow of a close adjustment to the forward surface of the pressing roller. The forward edges of said blades, h, are curved so as to operate to gradually depress within the molten glass a sheet of wire netting or gauze which has previously been laid upon the molten glass after preferably being heated to a proper temperature. These blades, h, may if desired have their forward edges straight, but inclined at an angle to the surface of the table so as to gradually press the wire within the glass and may each be separately secured to the frame or plate, H, so that they may be removed to be reground or reshaped, it being thus possible to have the operating edges comparatively sharp and make but small grooves in the glass to be subsequently closed by the passage of the pressing roller. The blades, h, must be rigidly secured to the roller-carrying frame and adjusted immediately in advance of the pressing roller, or in advance of the first roller where two are employed, and the lower edges or ends of the series of blades depend or hang slightly below the roller surface, and preferably underneath the same as shown more clearly in Fig. 2.

In operation, a quantity of molten glass is first poured upon the table, preferably comparatively evenly so as to present an approximately level upper face, and the wire netting, preferably previously heated to the proper temperature, is laid or applied to the surface of the molten glass, and by reason of its weight sinks partially in the same and to a slight extent tends to level the surface of the glass into the form of a sheet; the frame, G, is then traversed over this molten glass, moving in the direction of the arrow Fig. 1, and forces down into the glass the sheet of wire netting or gauze, as more clearly illustrated in Fig. 2, the blades, h, embedding the netting to a point about midway between the opposite faces of the sheet to be formed and leaving as they travel narrow grooves or passages. The pressing roller then follows and closes the openings made by the passage of the wire gauze and the pressing blades and effectually smooths the upper surface of the glass, producing a sheet of the required thickness having embedded within it, at its center, a sheet of wire gauze or netting.

In machines of this class with which I am familiar it has been usual after the pouring of the molten glass upon the table to first pass over the glass a pressing roller so as to form a sheet and then press into the sheet so formed the wire netting or gauze by means of a ribbed and grooved pressing roller and finally closing the openings made by the entrance of the wire netting or gauze and the ribbed roller by the passage of a subsequent plain roller. This method of first rolling the glass into the form of a sheet has been found in practice to partially chill the glass before the entrance of the wire gaze, or netting, and the subsequent introduction of the wire after a plate or sheet has been formed will to some extent weaken the glass and prevent its thorough fusing by the passage of the subsequent pressing roller, whereas in machines such as that forming the subject of my invention the wire netting is embedded in the molten glass immediately after the latter is poured upon the table, and before the passage of the roller, and the forcing of the netting will act, in a measure, to flatten the glass so that the work of the pressing roller will be somewhat lessened and it will be enabled to more effectively close the openings made by the passage of the wire and the pressing blades. I also find that the processes and means heretofore employed cannot produce glass with as fine a finish, as the surface of the glass through which the gauze has been forced is apt to be uneven, or to present irregularities and apparent air bubbles; further the rigid blades operate more effectually to embed the wire and to keep it centrally embedded in the glass than where a ribbed revolving roller is employed.

Having thus described my invention, what I claim, and desire to secure by Letters Patent, is—

1. In a machine for manufacturing wire glass, a table, roller provided upon said table, a frame carried by said roller, a series of embedding blades carried by said frame and depending therefrom to a point slightly below the circumferential line of the roller.

2. A machine for manufacturing wire glass, comprising in combination, a table, a series of rigid embedding blades, a frame carrying the same, a pressing roller situated to the rear of the blades and means for traversing such blades and rollers across the table, substantially as specified.

3. A machine for manufacturing wire glass comprising in combination, a table for the reception of the molten glass, a carrying frame adapted to be traversed over said table, a series of embedding blades adapted to force within the glass a sheet of wire netting or gauze, and a pressing roller located in the rear of said blades said blades and pressing roller being carried by the frame and moving therewith, substantially as specified.

4. In a machine for manufacturing wire glass a table, a frame, rollers journaled therein, a series of embedding blades h, secured to the forward end of said frame and depending therefrom in advance of the roller to a point below the roller and means for traversing such blades and rollers, substantially as described.

5. The combination of the table, the traversing frame, a pressing roller journaled in said frame, a series of embedding blades rigidly secured to said frame and carried thereby, the rear faces of said blades having a contour corresponding to the periphery of pressing roller and the forward edges of said blades being curved and adapted to force within the glass a sheet of wire netting, substantially as specified.

6. The combination of the table, a carrying frame, rollers journaled therein, wheels mounted on the axes of said rollers, adjustable rails on which said wheels are mounted and depending embedding blades secured to and carried by said frame, substantially as specified.

7. A machine for manufacturing wire glass, comprising in combination, a table for the reception of the glass, a pressing roller, a series of depending embedding blades mounted in front of said roller and having their forward faces inclined or curved and their rear ends being partly under the lower face of said pressing roller, substantially as specified.

8. A machine for manufacturing glass, comprising a table, a pressing roller, carrying wheels therefor mounted on the axes of said roller, and vertically adjustable rails on which said wheels may travel, substantially as specified.

In witness whereof I have hereunto set my hand this 5th day of October, A. D. 1893.

FRANK OVERN.

Witnesses:
H. GORDON McCOUCH,
JOHN E. PARKER.